US006119725A

United States Patent [19]

Shinobu et al.

[11] Patent Number: 6,119,725

[45] Date of Patent: Sep. 19, 2000

[54] VALVE DEVICE

[75] Inventors: Hideyuki Shinobu, Shiroishi; Kenichi Nomura, Sendai; Takumi Kimura, Miyagi-ken, all of Japan

[73] Assignee: Keihin Corporation, Tokyo, Japan

[21] Appl. No.: 09/152,508

[22] Filed: Sep. 14, 1998

[30] Foreign Application Priority Data

Oct. 22, 1997 [JP] Japan .................................... 9-289939
Jul. 30, 1998 [JP] Japan .................................. 10-216073

[51] Int. Cl.[7] ..................................................... F16K 37/00

[52] U.S. Cl. .................... 137/554; 251/129.15; 251/367; 123/568.26

[58] Field of Search ....................... 123/568.26; 137/554; 251/367, 129.15

[56] References Cited

U.S. PATENT DOCUMENTS 5,460,146 10/1995 Frankenberg ........................... 123/571
5,588,414 12/1996 Hrytzak et al. ......................... 123/571
5,704,585 1/1998 Hrytzak et al. .................... 251/129.15
5,901,940 5/1999 Hussey et al. ..................... 251/129.15
5,911,401 6/1999 Hrytzak et al. .................... 251/129.15
5,957,117 9/1999 Everingham ....................... 123/568.26

*Primary Examiner*—A. Michael Chambers
*Attorney, Agent, or Firm*—Paul A. Guss

[57] ABSTRACT

A fixing unit has a crown-shaped resilient member comprising an annular cylindrical member and a flange extending integrally from an upper end of the annular cylindrical member. The annular cylindrical member has a first tooth, and the flange has a second curved portion. The first tooth engages in an annular groove defined in the outer circumferential surface of an upper end of the housing, and the second curved portion presses a step on the outer circumferential surface of a lower portion of a sensor case, for fixing the sensor case and the housing to each other. A first support has a first flange supported on a step on an inner wall surface of the housing, and a second support has a first flange supported on another step on the inner wall surface of the housing. A coil is sandwiched and held between the first and second supports. The sensor case is directly held against the first support. The lower surface of the sensor case and the upper end of the housing are spaced a given distance from each other. A crown-shaped resilient member is installed on joined portions of the sensor case and the housing to hold the sensor case, the housing, the first and second supports, and the coil securely together.

12 Claims, 9 Drawing Sheets

VALVE DEVICE

BACKGROUND OF THE INVENTION

1. Field of the Invention

The present invention relates to a valve device, and more particularly to a valve device for use as an exhaust gas recirculation valve, which has a housing accommodating an actuator and a sensor case accommodating a sensor, the housing and the sensor case being fixed integrally with each other.

2. Description of the Related Art

Exhaust gas recirculation valves have heretofore been used to remove harmful emissions discharged from internal combustion engines. The exhaust gas recirculation valve is capable of bringing the intake and exhaust systems of the internal combustion engine into communication with each other in order to recirculate exhaust gases emitted from the internal combustion engine into the intake system for thereby reduce toxic pollutants such as NOx contained in the exhaust gases.

Generally, the exhaust gas recirculation valve comprises a valve body for selectively opening and closing a recirculation path which provides communication between intake and exhaust systems of the internal combustion engine, an actuator for actuating the valve body, and a sensor for detecting an open/closed state of the valve body. The actuator comprises upper and lower stators and a coil bobbin disposed between the upper and lower stators. The actuator is accommodated in a metal housing, and the sensor is housed in a synthetic resin case.

The metal housing and the synthetic resin case are fixed and connected to each other such that the synthetic resin case is molded over the coil bobbin accommodated in the metal housing according to an in-mold forming process, as shown in FIG. 3 of U.S. Pat. No. 5,460,146. The upper and lower stators and the coil bobbin are fixed within the metal housing.

Since the synthetic resin case is molded over the coil bobbin according to an in-mold forming process, the metal housing and the synthetic resin case cannot absorb stresses that are developed at the junction therebetween due to the difference between the coefficients of thermal expansion of the metal housing and the synthetic resin case. Therefore, the metal housing or the synthetic resin case tends to crack or creep. Another problem is that it is a complex process to assemble the exhaust gas recirculation valve. Once the metal housing and the synthetic resin case have been joined to each other, it is difficult to disassemble them for reuse.

The metal housing and the synthetic resin case may be fixed and connected to each other such that flanges on joints of the metal housing and the synthetic resin case are secured to each other by crimping members having teeth that bite into the synthetic resin case, as shown in FIG. 1 of U.S. Pat. No. 5,588,414.

In order to prepare for thermal expansion of the metal housing and the synthetic resin case, the flanges thereof need to be secured by the crimping members while a large load is being applied to the crimping members. Consequently, the process of fixing and joining the metal housing and the synthetic resin case to each other is complex. Upon thermal expansion of the metal housing and the synthetic resin case, the crimping members are liable to creep and hence lower their clamping forces. Furthermore, since the crimping members are fixed to the synthetic resin case with their teeth biting into the synthetic resin case, the crimping members and the synthetic resin case will not be available for reuse after the exhaust gas recirculation valve is disassembled.

SUMMARY OF THE INVENTION

It is therefore an object of the present invention to provide a valve device which includes a metal housing and a synthetic resin case whose junctions are reliably fixed to each other so as to absorb thermal expansion thereof, which can easily be manufactured and assembled, and which have components that can be disassembled and reused.

Another object of the present invention is to provide a valve device which can maintain excellent performance and durability, and is made up of a relatively small number of components so that the valve device can be manufactured relatively inexpensively.

To achieve the above objects, a crown-shaped resilient member which is substantially complementary in shape to joined portions of a housing and a sensor case is resiliently fitted over the joined portions to fix the housing and the sensor case to each other. With this arrangement, the joined portions of the housing and the sensor case are secured to each other easily and reliably.

According to the present invention, furthermore, the housing and the sensor case are fixed to each other by the crown-shaped resilient member, and an actuator has a stator and a coil bobbin which are sandwiched and held in position between the housing and the sensor case. This arrangement reduces the number of parts used, and allows a valve device to be manufactured inexpensively. Since vibrations produced in the coil bobbin and other parts are absorbed by the crown-shaped resilient member, the valve device provides excellent performance.

The above and other objects, features, and advantages of the present invention will become apparent from the following description when taken in conjunction with the accompanying drawings in which preferred embodiments of the present invention are shown by way of illustrative example.

DETAILED DESCRIPTION OF THE PREFERRED EMBODIMENTS

A valve device according to a first embodiment of the present invention will be described below.

Figure 1:
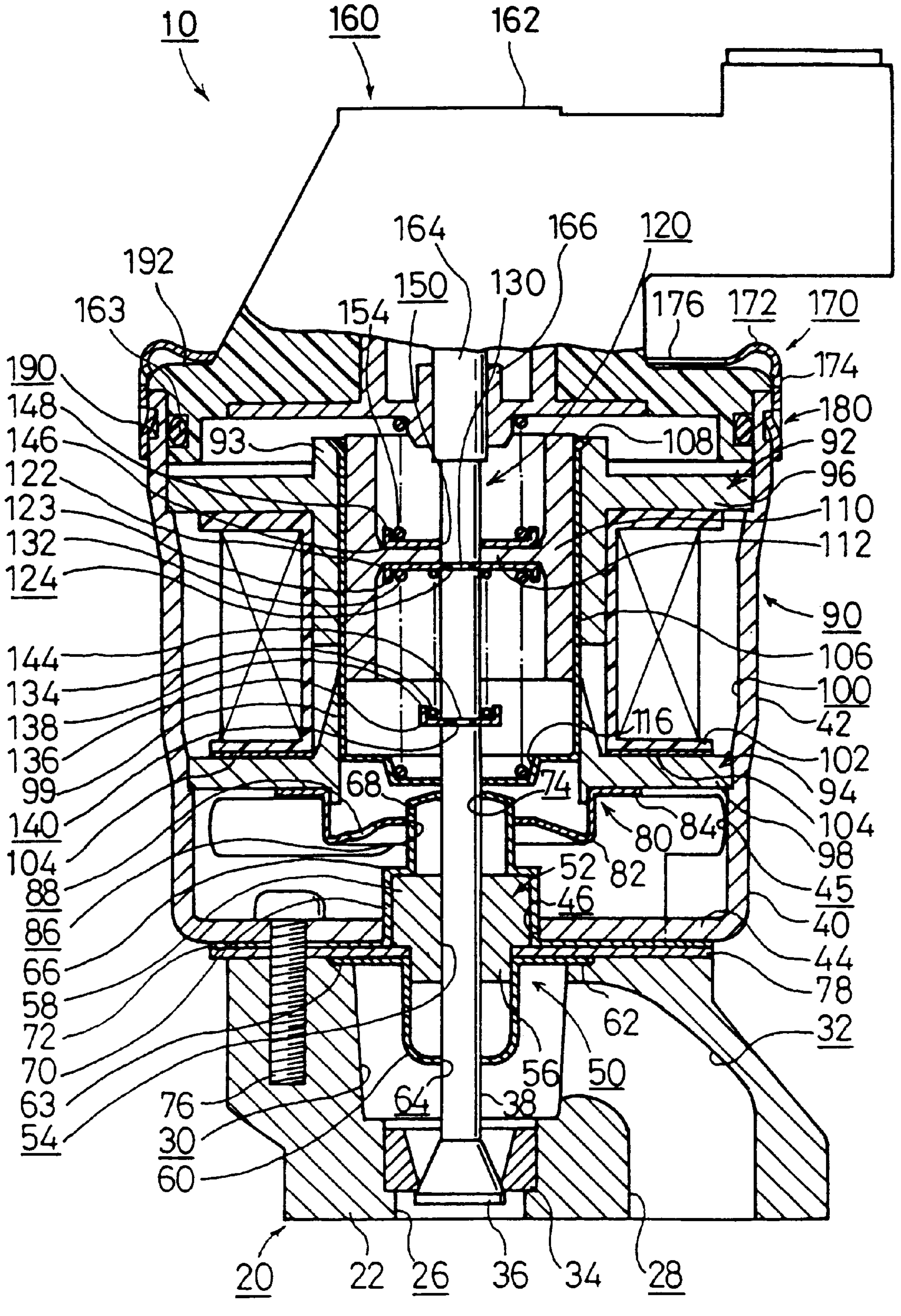
FIG. 1 is a cross-sectional view of an exhaust gas recirculation valve according to a first embodiment of the present invention.

As shown in FIG. 1, an exhaust gas recirculation valve 10 as a valve device according to the first embodiment of the present invention generally comprises a valve assembly 20 for controlling circulation of exhaust gases from an exhaust system to an intake system of an internal combustion engine which is coupled to the exhaust gas recirculation valve 10, a guide assembly 50, an actuator 90 for actuating the valve assembly 20, and a sensor unit 160 for detecting an open/closed state of the valve assembly 20.

The valve assembly 20 includes a valve casing 22 having an inlet port 26 opening at a lower surface thereof and connected to the exhaust system of the internal combustion engine and an outlet port 28 opening at a lower surface thereof and connected to the intake system of the internal combustion engine. The inlet port 26 and the outlet port 28 can communicate with each other through an upper hole 30 defined in the valve casing 22 above the inlet port 26 and a recirculation path 32 defined in the valve casing 22 above the outlet port 28. The upper hole 30 extends from the upper end of the inlet port 26 to an upper surface of the valve casing 22. An annular valve seat 34 is disposed in the inlet port 26, and a valve stem 38 extends through the inlet port 26 and the upper hole 30 and is inserted in the valve seat 34. A valve body 36 is mounted on a lower distal end of the valve stem 38. When the valve body 36 is seated on a lower end of the valve seat 34, the valve body 36 closes the inlet port 26. When the valve body 36 is spaced downwardly from the lower end of the valve seat 34, the valve body 36 opens the inlet port 26. The upper surface of the valve casing 22 is held against a lower surface of a housing 40 with a seal 78 interposed therebetween. The valve casing 22 is fastened to the housing 40 by a plurality of screws 76.

The housing 40 is made of a metallic material, and has a cylindrical side wall 42 and a horizontal bottom wall 44 integral with a lower end of the cylindrical side wall 42. The housing 40 also has a window 45 defined in the side wall 42 and the bottom wall 44. The interior of the housing 40 communicates with the exterior (atmosphere) of the housing 40 through the window 45. The bottom wall 44 has a substantially central hole 46 defined therein. The valve stem 38 coaxially extends through a guide block 52 of the guide assembly 50 that is fitted in the hole 46. The valve stem 38 inserted in the housing 40 is slidably supported by the guide block 52.

The guide block 52 is made of a heat-resistant material such as sintered carbon. The guide block 52 is substantially cylindrical in shape and has an axially through hole 54 defined vertically therein. The guide block 52 is of a unitary structure which has an upper larger-diameter portion 58 and a lower smaller-diameter portion 56. The guide block 52 is vertically disposed in and sandwiched between first and second guide covers 60, 66 which are disposed coaxially with the valve stem 38, and is shielded from the exterior by the first and second guide covers 60, 66. The first and second guide covers 60, 66 are made of a heat-resistant material. A space is defined vertically between the first guide cover 60 and an upper surface of the guide block 52, and a space is also defined vertically between the second guide cover 66 and a lower upper surface of the guide block 52.

The first guide cover 60 is substantially of a cup shape having an inside diameter equal to the diameter of the lower smaller-diameter portion 56 of the guide block 52. The first guide cover 60 has a first flange 62 extending radially outwardly integrally from an upper open end thereof. The first guide cover 60 has a first hole 64 defined in a lower closed end thereof through which the valve stem 38 extends. The first guide cover 60 is placed in the upper hole 30 of the valve assembly 20 with the first flange 62 facing upwardly. The first flange 62 has an outer edge fitted in an annular groove 63 defined in a central area of the upper surface of the valve casing 22 around the upper hole 30.

The second guide cover 66 is also substantially of a cup shape having an upper smaller-diameter portion 68 and a lower larger-diameter portion 70 which is greater in diameter than the upper smaller-diameter portion 68 and has an inside diameter equal to the diameter of the larger-diameter portion 58 of the guide block 52. The second guide cover 66 has a second hole 74 defined in an upper closed end through which the valve stem 38 extends, and a second flange 72 extending radially outwardly integrally from a lower open end thereof. The second guide cover 66 is placed in the hole 46 in the housing 40 with the second flange 72 facing downwardly. The second flange 72 is held against the lower surface of the housing 40. The guide block 52 thus housed in the second guide cover 66 is shielded from the bottom of the housing 40 against entry of contaminated water and other contaminants that have entered the housing 40.

The seal 78 is interposed between the first flange 62 and the second flange 72, which are sandwiched between the lower surface of the housing 40 and the upper surface of the valve casing 22 and fastened in position by the screws 76. The valve stem 38 extends vertically through the axially through hole 54, the first hole 64, and the second hole 74, and is axially displaceably supported in the guide assembly 50.

A cover 80 has a substantially cup-shaped cover member 82 having a flange 84 extending radially outwardly integrally from an upper open end thereof. The cover member 82 has a hole 86 defined substantially centrally in an upwardly convex bottom thereof and having a diameter equal to the diameter of the smaller-diameter portion 68 of the second guide cover 66. The cover member 82 has a plurality of air passage holes 88 defined in the upwardly convex bottom around the hole 86. The upwardly convex bottom has a central region inclined upwardly in the radially inward direction, with the hole 86 defined therein. The flange 84 of the cover member 82 is fixed to a lower surface of a second support 94 (described later on) as by welding, with the smaller-diameter portion 68 of the second guide cover 66 fitted in the hole 86.

The cover member 82 is disposed axially between the bottom of the housing 40 and the actuator 90, and extends radially between the second support 94 and the smaller-diameter portion 68. The cover member 82 has the upwardly convex bottom with its central region inclined upwardly in the radially inward direction, as described above. Contaminated water which has entered the cover member 82 through the air passage holes 88 is trapped in a downwardly concave region around the upwardly inclined central region, and discharged through the air passage holes 88. Therefore, contaminated water which has entered the housing 40 through the window 45 is prevented from entering the second guide cover 66, i.e., the guide block 52, and the actuator 90. Exhaust gases which have entered the housing 40 along the valve stem 38 through the first hole 64, the axially through hole 54, and the second hole 74 are discharged through the air passage holes 88 and the window 45 out of the housing 40.

The actuator 90 comprises a which may also be referred to as a first support (first stator) 92 and a which may also be referred to as a second support (second stator) 94, each having a substantially cylindrical inner hole around the valve stem 38. The actuator 90 is disposed in the housing 40 with the first support 92 positioned above the second support 94. The first support 92 and the second support 94 serve as a pair of magnetic pole members.

Figure 2:
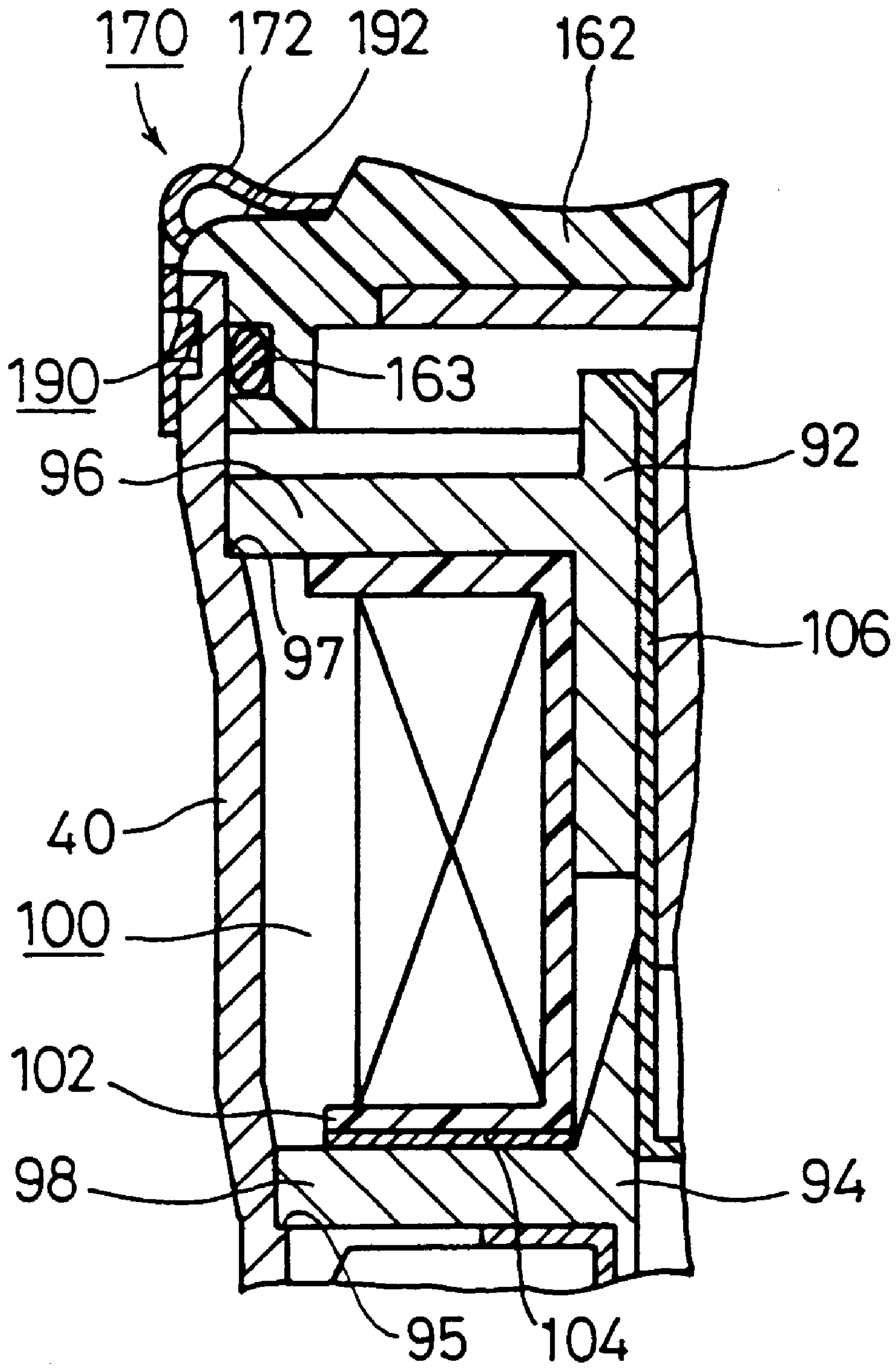
FIG. 2 is an enlarged fragmentary cross-sectional view of an actuator of the exhaust gas recirculation valve shown in FIG. 1.

The first support 92 has a first flange 96 extending radially perpendicularly to the valve stem 38 and having a radially outer end fixed to an upper portion of the housing 40, and a first tubular member 93 extending along the valve stem 38 and joined to a radially inner end of the first flange 96. As shown in FIG. 2, the radially outer end of the first flange 96 is pressed against and secured to an annular step 97 on an upper inner wall surface of the housing 40.

As shown in FIG. 1, the second support 94 has a second flange 98 extending radially perpendicularly to the valve stem 38 and having a radially outer end held against a lower portion of the housing 40, and a second tubular member 99 extending along the valve stem 38 and joined to a radially inner end of the second flange 98, the second tubular member 99 axially facing the first tubular member 93 of the first support 92. As shown in FIG. 2, the radially outer end of the second flange 98 is held against an annular step 95 on a lower inner wall surface of the housing 40. Therefore, the second support 94 is prevented from being displaced downwardly in FIG. 1. The second tubular member 99 is upwardly tapered such that its outside diameter is progressively smaller in the upward direction. This tapered structure of the second tubular member 99 makes axial electromagnetic forces applied to a plunger 110 (described later on) proportional to the position of the plunger 110.

The flange 84 of the cover member 82 is fixed to a lower surface of the second flange 98. The second support 94, the cylindrical side wall 42 and the horizontal bottom wall 44 of the housing 40 jointly define a space in the housing 40 which communicates with the exterior of the housing 40 through the window 45. The heat of exhaust gases which has been transferred through the valve assembly 20 and the guide assembly 50 to the interior of the housing 40 is dissipated through the window 45 without being transferred to the actuator 90.

The first support 92, the second support 94, and the housing 40 jointly define an annular space 100 which houses a coil (coil bobbin) 102 for actuating the valve stem 38. The coil 102 is fixedly positioned in the annular space 100 by a spring washer 104 placed on the second flange 98. The spring washer 104 exerts resilient forces to press the second flange 98 against the step 95, thereby securing the second flange 98 to the step 95. The coil 102 is electrically connected to a power supply device (not shown).

A substantially cup-shaped sleeve 106 made of a non-magnetic material with its bottom facing downwardly is inserted in inner holes of the first and second supports 92, 94. The sleeve 106 has an annular ridge 108 bent radially outwardly from an upper end thereof and engaging a radially inner edge of the upper end of the first support 92. The sleeve 106 has a cup-shaped downward recess 116 in its bottom which serves as a guide for a first resilient member 132 (described later on). The bottom of the sleeve 106 has a hole defined substantially centrally in the recess 116, through which the valve stem 38 extends.

A substantially cylindrical plunger 110 made of a magnetic material is axially slidably disposed in the sleeve 106 coaxially with the valve stem 38. The plunger 110 has an outer cylindrical surface slidable against the inner surface of the sleeve 106. The plunger 110 and the valve stem 38 are connected to each other by a coupling unit 120 which engages a radial flange 112 fixed to and disposed in the plunger 110.

The coupling unit 120 has a first retainer 122 substantially in the form of a disk having a diameter which is smaller than the inside diameter of the plunger 110, but is essentially the same as the diameter of the recess 116 in the bottom of the sleeve 106. The first retainer 122 has a first annular ridge 123 bent downwardly from an outer circumferential edge thereof. The first retainer 122 has a first hole 124 defined substantially centrally therein by an annular edge thereof. The annular edge which defines the first hole 124 is fitted in a first annular slot 130 defined in the outer circumferential surface of the valve stem 38. Therefore, the first retainer 122 is retained on the valve stem 38. The first retainer 122 is fixed in position against the valve stem 38 under upward forces applied from a first resilient member 132 and/or a second resilient member 134.

The first resilient member 132, which is typically a helical coil spring, is substantially of a cylindrical shape having a diameter equal to the diameter of the recess 116. The first resilient member 132 is disposed coaxially with the valve stem 38 axially between the first retainer 122 and the recess 116. The first resilient member 132 is prevented from being displaced horizontally in FIG. 1 by the first annular ridge 123 of the first retainer 122 and a circumferential slanted wall of the recess 116.

The second resilient member 134, which is also typically a helical coil spring, is substantially of a cylindrical shape having a diameter smaller than the diameter of the first resilient member 132. The second resilient member 134 is disposed coaxially with the valve stem 38 radially inwardly of the first resilient member 132. The second resilient member 134 has an upper end held against the first retainer 122 and a lower end held against a second retainer 136 on the valve stem 38. Thus, the second resilient member 134 normally urges the first retainer 122 upwardly, and urges the second retainer 136 downwardly. The second resilient member 134 is prevented from being displaced horizontally in FIG. 1 by the valve stem 38 and a second annular ridge 138 of the second retainer 136.

The second retainer 136 is mounted on the valve stem 38 at a position spaced a given distance downwardly from the first retainer 122. The second retainer 136 is substantially in the form of a disk having a diameter which is smaller than the diameter of the first retainer 122, but is essentially the same as the diameter of the second resilient member 134. The second annular ridge 138 is bent upwardly from an outer circumferential edge of the second retainer 136. The second annular ridge 138 prevents the second resilient member 134 from being displaced horizontally in FIG. 1.

The second retainer 136 has a second hole 140 defined substantially centrally therein by an annular edge thereof. The annular edge which defines the second hole 140 is fitted in a second annular slot 144 defined in the outer circumferential surface of the valve stem 38. Therefore, the second retainer 136 is retained on the valve stem 38. The second retainer 136 is fixed in position on the valve stem 38 under downward forces applied from the second resilient member 134. When the second retainer 136 bottoms the recess 116 upon downward movement of the plunger 110, the second retainer 136 limits the plunger 110 against further downward movement.

A third retainer 146 is axially slidably mounted on the valve stem 38 above the first retainer 122. The third retainer 146 is substantially in the form of a disk having a diameter which is essentially the same as the diameter of the first retainer 122. The third retainer 146 has a third annular ridge 148 bent upwardly from an outer circumferential edge thereof. The third retainer 146 has a hole 150 defined substantially centrally therein, with the valve stem 38 extending therethrough for relative sliding movement with respect to the third retainer 146. The third retainer 146 is normally urged downwardly against the flange 112 by a third resilient member 154.

The third resilient member 154, which is also typically a helical coil spring, is substantially of a cylindrical shape having a diameter essentially the same as the diameter of the third retainer 146 and the first resilient member 132. The third resilient member 154 is disposed coaxially with the valve stem 38 axially between the third retainer 146 and a sensor case 162 of the sensor unit 160. The third resilient member 154 is prevented from being displaced horizontally in FIG. 1 by the third annular ridge 148 of the third retainer 146 and an outer circumferential surface of a bearing 166 disposed on a lower end of the sensor case 162.

The radial flange 112 in the plunger 110 extends radially inwardly from the plunger 110 to the valve stem 38. The third retainer 146 is held against the upper surface of the radial flange 112 and the first retainer 122 is held against the lower surface of the radial flange 112. When no current is supplied or no voltage is applied to the coil 102, the plunger 110 is axially displaced to and held in an upper limit position under the upward resilient forces from the first resilient member 132. At this time, the valve body 36 is seated on the valve seat 34, thus closing the valve assembly 20 to disconnect the inlet port 26 and the outlet port 28 from each other.

The third resilient member 154 causes the third retainer 146 to urge the plunger 110 downwardly for thereby reducing shocks generated when the plunger 110 impinges on the lower surface of the sensor case 162 and also when the valve body 36 impinges on the valve seat 34. The radial flange 112 is always kept in abutment against the first retainer 122 for thereby preventing vibrations which would otherwise occur if the first retainer 122 were loose from the radial flange 112.

The sensor case 162 is molded of a synthetic resin, for example, and coupled to an upper end of the housing 40 with an O-ring 163 sealingly interposed between the sensor case 162 and the housing 40.

The sensor unit 160 has a sensor rod 164 coupled to a sensor (not shown) housed in the sensor case 162 and supported by the bearing 166. The sensor rod 164 has a lower distal end connected to an upper end of the valve stem 38 remote from the valve body 36. An open/closed state of the valve assembly 20 is transmitted through the valve stem 38 and the sensor rod 164, and detected by the sensor. A detected signal from the sensor is sent to a control circuit (not shown). The sensor case 162 also houses a connector (not shown) which electrically connects the coil 102 to the non-illustrated power supply device. Joined portions of the sensor case 162 and the housing 40 is fixed by a fixing unit 170.

The fixing unit 170 comprises a crown-shaped resilient member 172 by which joined surfaces of the sensor case 162 and the housing 40 are firmly kept together. The crown-shaped resilient member 172 is mounted on the joined portions of the sensor case 162 and the housing 40 by an annular groove 190 of substantially channel-shaped cross section which is defined in an outer circumferential surface of the upper end of the housing 40 and a step 192 on an outer circumferential surface of a lower portion of the sensor case 162.

Figure 3:
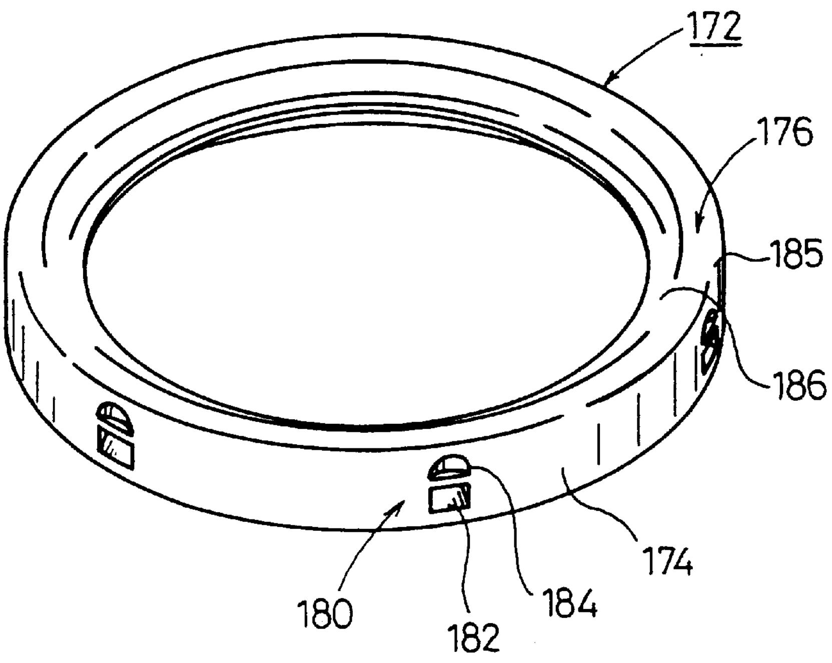
FIG. 3 is a perspective view of a crown-shaped resilient member of a fixing unit of the exhaust gas recirculation valve shown in FIG. 1.

As shown in FIG. 3, the crown-shaped resilient member 172 has an annular cylindrical member 174 substantially complementary in shape to the outer circumferential surfaces of the sensor case 162 and the housing 40. The annular cylindrical member 174 has an integral flange 176 extending radially inwardly from an upper end thereof, and is made of a resilient material such as a metallic material or the like. The annular cylindrical member 174 has a plurality of raised regions 180 positioned for engagement in the annular groove 190 in the housing 40. Each of the raised regions 180 comprises a first lower tooth 182 projecting radially inwardly and a second upper tooth 184 projecting radially inwardly and positioned above the first lower tooth 182.

Figure 4:
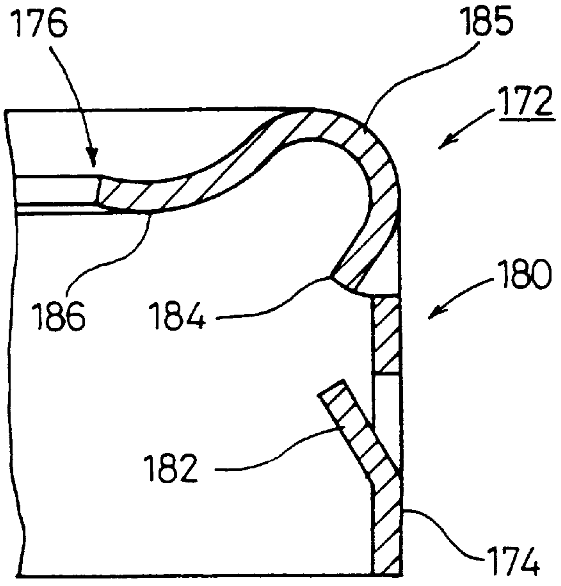
FIG. 4 is an enlarged fragmentary cross-sectional view of a raised region of the crown-shaped resilient member.

As shown in FIG. 4, the first tooth 182 is formed by slitting upper and lateral sides of a portion of the annular cylindrical member 174 which has a length smaller than the height of the annular groove 190 in the housing 40, and bending that portion inwardly about its lower end. The first tooth 182, which is inclined inwardly in the upward direction, resiliently engages in the annular groove 190 to prevent the crown-shaped resilient member 172 from being dislodged.

The second tooth 184 is disposed on the annular cylindrical member 174 at a position spaced a given distance vertically from the first tooth 182. As shown in FIG. 4, the second tooth 184 is formed by slitting only a lower side of a portion of the annular cylindrical member 174 near its upper end, and bending that portion inwardly about all other sides. The second tooth 184, which is inclined inwardly in the downward direction, has its tip end facing the tip end of the first tooth 182, and is held against an outer surface of the sensor case 162 for thereby preventing the crown-shaped resilient member 172 from being further displaced toward the housing 40.

The crown-shaped resilient member 172 has a first curved portion 185 of curved cross section extending upwardly from the second teeth 184, and a second curved portion (ledge) 186 extending inwardly from a terminal end of the first curved portion 185 and curved gradually away from the first curved portion 185. The second curved portion 186 virtually serves as the flange 176. The second curved portion 186 engages the step 192 of the sensor case 162. The first curved portion 185 and the second curved portion 186 resiliently presses the sensor case 162. Therefore, the crown-shaped resilient member 172 holds the joined portions of the sensor case 162 and the housing 40 together through the engagement of the raised regions 180 in the annular groove 190 and the resilient pressing of the sensor case 162 by the first curved portion 185 and the second curved portion 186.

The axial distance between the upper end of the first tooth 182 and the lower surface of the second curved portion 186 is smaller than the distance between the upper surface of the annular groove 190 and the upper surface of the step 192. The distance between the upper end of the first tooth 182 and the lower end of the second tooth 184 is greater than the distance between the upper surface of the annular groove 190 and the outer circumferential surface of the sensor case 162 which is engaged by the second tooth 184.

Operation and advantages of the exhaust gas recirculation valve 10 according to the first embodiment will be described below.

The fixing unit 170 is assembled as follows:

As shown in FIGS. 5A–5F, the housing 40 and the sensor case 162 are fixed to each other by joining the housing 40 and the sensor case 162 to each other and then securing the joined portions of the housing 40 and the sensor case 162 with the crown-shaped resilient member 172.

Figure 5A:
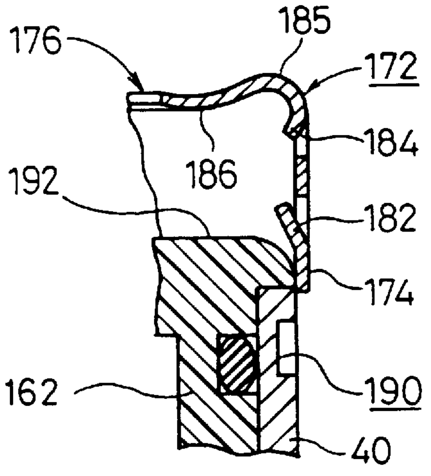
FIGS. 5A through 5F are enlarged fragmentary cross-sectional views illustrative of the manner in which the fixing unit is installed.
Figure 5B:
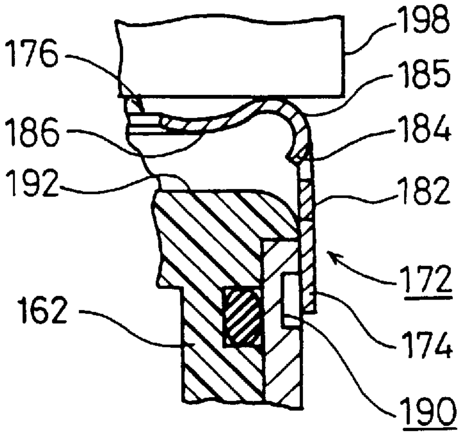

Specifically, the crown-shaped resilient member 172 is displaced over the joined portions of the housing 40 and the sensor case 162 from the sensor case 162, as shown in FIG. 5A. At this time, a presser 198 (see FIG. 5B) is pressed against the crown-shaped resilient member 172 to displace the crown-shaped resilient member 172 downwardly. The first tooth 182 is contacted and pushed radially outwardly by the outer circumferential surfaces of the housing 40 and the sensor case 162, and hence elastically deformed radially outwardly, as shown in FIG. 5B.

Figure 5C:
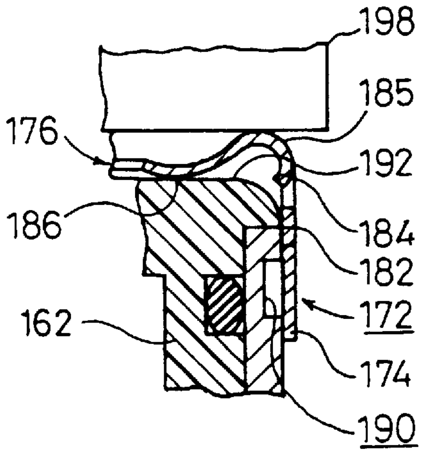
Figure 5D:
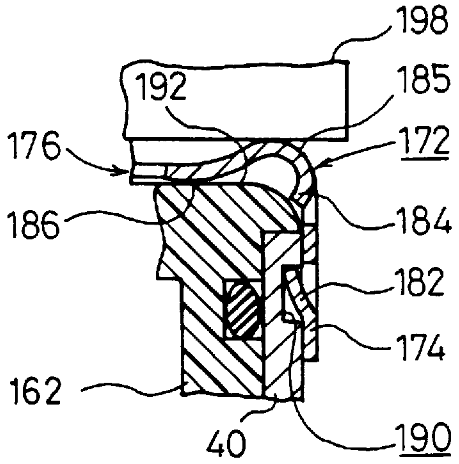

After the second curved portion 186 abuts against the step 192, as shown in FIG. 5C, the crown-shaped resilient member 172 is further displaced downwardly while the first and second curved portions 185, 186 being elastically deformed. When the first tooth 182 reaches a position radially aligned with the annular groove 190, the first tooth 182 is released from the radially outward push, and snaps radially outwardly into the annular groove 190, thus restoring its original shape. If the presser 198 is removed at this time, then the crown-shaped resilient member 172 is subject to forces tending to displace itself upwardly under the resiliency of the flange 176. However, since the upper end of the first tooth 182 engages the upper end of the annular groove 190, the crown-shaped resilient member 172 is prevented from being displaced upwardly. Therefore, the crown-shaped resilient member 172 remains to hold the joined portions of the housing 40 and the sensor case 162 together due to clamping forces developed between the second curved portion 186 and the first tooth 182, as shown in FIG. 5D. The position in which the crown-shaped resilient member 172 is thus mounted on the sensor case 162 and the housing 40 will hereinafter be referred to as a properly set position.

Figure 5E:
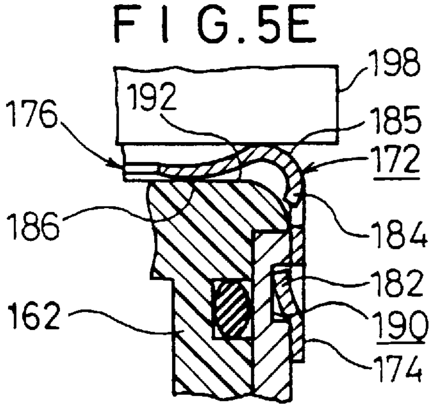
Figure 5F:
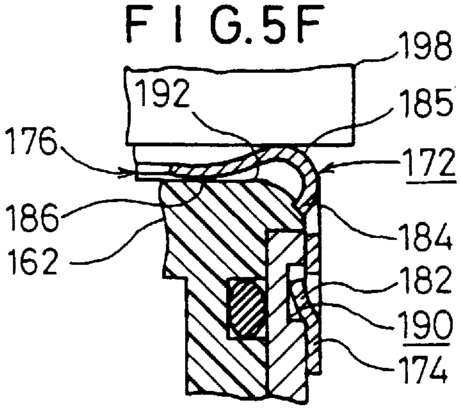

After the presser 198 has further pressed the crown-shaped resilient member 172, as shown in FIG. 5E, the presser 198 is spaced from the crown-shaped resilient member 172. The crown-shaped resilient member 172 is now returned to the properly set position under the resiliency of the flange 176, as shown in FIG. 5D. When the crown-shaped resilient member 172 is further displaced downwardly, the second tooth 184 is brought into contact with the outer surface of the sensor case 162, as shown in FIG. 5F. Since the second tooth 184 is formed by slitting only a lower side of a portion of the annular cylindrical member 174 and deforming that portion into an arcuate cross-sectional shape, the second tooth 184 is relatively less elastically deformable under external forces. Consequently, the crown-shaped resilient member 172 is prevented by the second tooth 184 from being further displaced downwardly over the joined portions of the sensor case 162 and the housing 40. When the presser 198 is spaced from the crown-shaped resilient member 172, the crown-shaped resilient member 172 is returned to the properly set position under the resiliency of the flange 176, as shown in FIG. 5D.

When the crown-shaped resilient member 172 is displaced over joined portions of the sensor case 162 and the housing 40, as described above, inasmuch as the first tooth 182 is elastically deformed, the sensor case 162 or the housing 40 is protected from damage which would otherwise be caused by the first tooth 182. Since the crown-shaped resilient member 172 can be pushed downwardly with a relatively low load, it is not necessary to employ a large-size fixing unit to secure the housing 40 and the sensor case 162 to each other. As a result, the housing 40 and the sensor case 162 can easily be fixed to each other.

Even when the crown-shaped resilient member 172 is pushed beyond the properly set position, the crown-shaped resilient member 172 is returned to the properly set position under the resiliency of the flange 176 upon removal of the push from the crown-shaped resilient member 172. Further downward pressing of the crown-shaped resilient member 172 is limited by the second tooth 184. Consequently, the crown-shaped resilient member 172 can easily be installed on the housing 40 and the sensor case 162.

The exhaust gas recirculation valve 10 operates as follows:

In the exhaust gas recirculation valve 10, the valve assembly 20 is opened when a current is supplied or a voltage is applied to the coil 102 of the actuator 90. The valve assembly 20 is closed when a current is no longer supplied or a voltage is no longer applied to the coil 102.

Specifically, when a predetermined current is supplied or a predetermined voltage is applied to the coil 102 from the power supply device based on an instruction from the control circuit, the coil 102 generates a magnetic field, exerting a downward electromagnetic force on the plunger 110. Because the second tubular member 99 of the second support 94 is tapered, the axial electromagnetic force on the plunger 110 is proportional to the position of the plunger 110.

When the plunger 110 is displaced downwardly against the resiliency of the first resilient member 132 while causing the radial flange 112 to push the first retainer 122, the valve stem 38 connected to the first retainer 122 is also displaced downwardly as it is guided by the guide block 52. At this time, the valve body 36 mounted on the valve stem 38 is also displaced downwardly off the valve seat 34, providing communication between the inlet port 26 and the outlet port 28. Now, the valve assembly 20 is opened. The plunger 110 stops at a position where the electromagnetic force and the resilient force of the first resilient member 132 are brought into equilibrium. Therefore, the extent to which the valve assembly 20 is opened is determined by the magnitude of the current supplied or the voltage applied to the coil 102.

The lower limit position for the plunger 110 is determined by the second retainer 136. Therefore, the plunger 110 is prevented from hitting the bottom of the sleeve 106 and hence from being damaged by the bottom of the sleeve 106.

When the coil 102 is de-energized, the plunger 110 is displaced upwardly under the bias of the first resilient member 132, displacing the valve stem 38 upwardly as it is guided by the guide block 52. Finally, the valve body 36 mounted on the valve stem 38 is seated on the valve seat 34, closing the inlet port 26. Now, the valve assembly 20 is closed.

The third resilient member 154 normally biases the plunger 110 to move downwardly through the third retainer 146. Therefore, shocks produced when the plunger 110 impinges on the lower surface of the sensor case 162 are reduced, and shocks generated when the valve body 36 is seated on the valve seat 34 are also reduced through the second retainer 136 and the valve stem 38. The downward bias of the third resilient member 154 holds the radial flange 112 in abutment against the first retainer 122 at all times, thus preventing vibrations which would otherwise happen if the first retainer 122 were loose from the radial flange 112. Furthermore, since the plunger 110 and the first retainer 122 are not directly coupled to each other, the inertial force of the plunger 110 is not imposed on the valve stem 38 when the valve assembly 20 is closed. Consequently, when the valve body 36 is seated on the valve seat 34, the valve body 36 or the valve seat 34 suffers no damage.

The open/closed state of the inlet port 26 is transmitted through the valve stem 38 and the sensor rod 164 to and detected by the non-illustrated sensor in the sensor case 162. The detected open/closed state is fed back to the control circuit.

When the heat of exhaust gases is transferred to the housing 40 and the sensor case 162, the housing 40 and the sensor case 162 are thermally expanded by the applied heat. Even if the dimensions of the housing 40 and the sensor case 162 which are clamped by the crown-shaped resilient member 172 change, such a change is absorbed by the flange 176. Therefore, the joined portions of the housing 40 and/or the sensor case 162 are prevented from cracking or being otherwise damaged. The sensor case 162 and/or the crown-shaped resilient member 172 is also prevented from creeping.

In the first embodiment, as described above, the crown-shaped resilient member 172 has the first teeth 182 engaging in the annular groove 190 in the housing 40 for preventing the crown-shaped resilient member 172 from being dislodged and the flange 176 for pressing the sensor case 162 downwardly under its own resiliency. The crown-shaped resilient member 172 fixes the joined portions of the housing 40 and the sensor case 162 with gripping forces exerted between the first teeth 182 and the flange 176.

The fixing unit 170 may thus be of a simple structure and is capable of fixing the housing 40 and the sensor case 162 easily and reliably. Even if the housing 40 or the sensor case 162 is thermally expanded, since such thermal expansion can be absorbed by the flange 176, the exhaust gas recirculation valve 10 is highly durable.

The crown-shaped resilient member 172 can be removed. Specifically, the housing 40, the sensor case 162, and the crown-shaped resilient member 172 can be disassembled and reused.

Because the inside diameter of the cylindrical member 174 of the crown-shaped resilient member 172 is substantially the same as the outside diameter of the joined portions of the sensor case 162 and the housing 40, the cylindrical member 174 is effective to limit lateral relative displacement of the sensor case 162 and the housing 40.

Furthermore, inasmuch as the crown-shaped resilient member 172 is shaped substantially as a cup, it can easily be manufactured by a pressing process. Since the housing 40 and the sensor case 162 do not need to have fixing flanges or the like, the exhaust gas recirculation valve 10 may be relatively small in size.

A valve device according to a second embodiment of the present invention will be described below with reference to FIG. 6. Those parts of the valve device according to the second embodiment, and also those of third through sixth embodiments described later on, which are identical to those of the first embodiment are denoted by identical reference numerals, and will not be described below.

Figure 6:
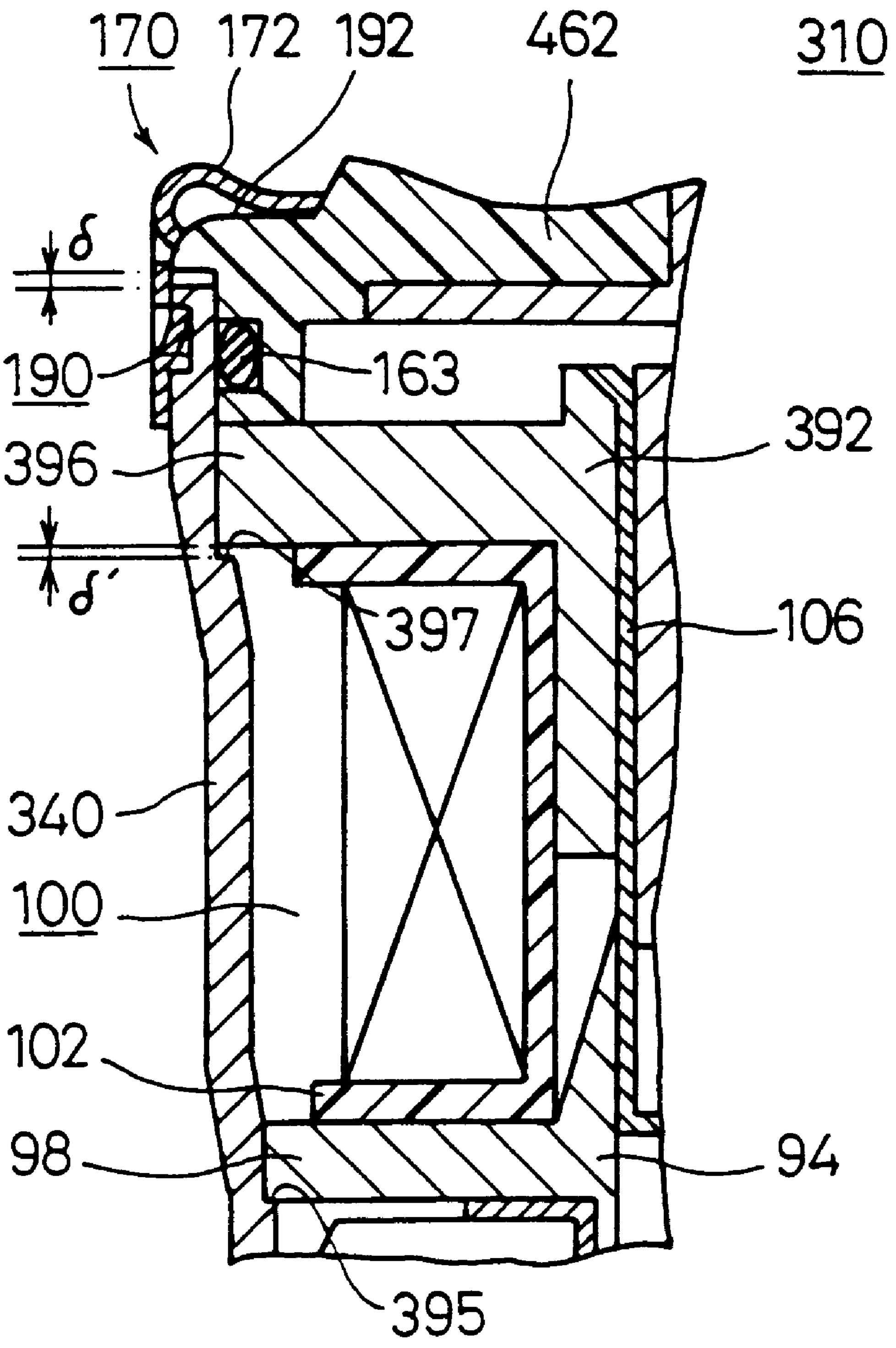
FIG. 6 is an enlarged fragmentary cross-sectional view of an actuator of an exhaust gas recirculation valve according to a second embodiment of the present invention.

FIG. 6 shows an exhaust gas recirculation valve 310 according to the second embodiment of the present invention. As shown in FIG. 6, the second flange 98 of the second support 94 is held against a step 395 on a lower inner wall surface of a housing 340. Therefore, the second support 94 is prevented from being displaced downwardly in FIG. 6. The coil 102 is held in direct contact with the second flange 98.

A first support 392 is held against the coil 102, and prevented from being displaced downwardly by the coil 102 and the second support 94. The first support 392 has a first flange 396 spaced a distance δ' upwardly from a step 397 on an upper inner wall surface of the housing 340. Therefore, the first support 392 is not directly fixed to the housing 340.

A sensor case 462 has a lower end held directly against the first flange 396 of the first support 392. The housing 340 has an upper end spaced a distance δ downwardly from the sensor case 462. Therefore, the pressure exerted by the crown-shaped resilient member 172 is applied between the sensor case 462 and the housing 340 through the first support 392, the coil 102, and the second support 94. Accordingly, the sensor case 462 and the housing 340 are fixed to each other, and the first support 392, the coil 102, and the second support 94 are fixedly disposed in the housing 340.

In the exhaust gas recirculation valve 310 according to the second embodiment, as described above, the sensor case 462 and the housing 340 are fixed to each other by the crown-shaped resilient member 172, and the first support 392, the coil 102, and the second support 94 are fixedly disposed in the housing 340. Thus, the crown-shaped resilient member 172 doubles as a means for fixing the sensor case 462 and the housing 340 to each other and a means for securely fixing the first support 392, the coil 102, and the second support 94 in the housing 340.

Inasmuch as no spring washer is required to be interposed between the coil 102 and the first support 392 or the second support 94, the number of parts used is reduced, making the exhaust gas recirculation valve 310 relatively inexpensive.

Since vibrations produced in the coil 102 are absorbed by the crown-shaped resilient member 172, the exhaust gas recirculation valve 310 can achieve a level of performance which is the same as or higher than if a spring washer is employed.

The first support 392 is not directly secured to the housing 340. Consequently, it is not necessary to press-fit the first support 392 into the housing 340, and the housing 340 does not need to be machined highly accurately in the vicinity of the step 397 on the inner wall surface of the housing 340.

The coil 102 is placed on and fixed to the upper surface of the second flange 98 of the second support 94. Accordingly, the coil 102 can be positioned accurately with respect to the housing 340.

Vibrations produced by the actuator 390 in the housing 340 are dampened by a damping action of the crown-shaped resilient member 172 when they are transmitted to the sensor case 462. Therefore, an open/closed state of the valve assembly can be detected in an error-free fashion by a sensor in the sensor case 462.

A valve device according to a third embodiment of the present invention will be described below with reference to FIG. 7.

Figure 7:
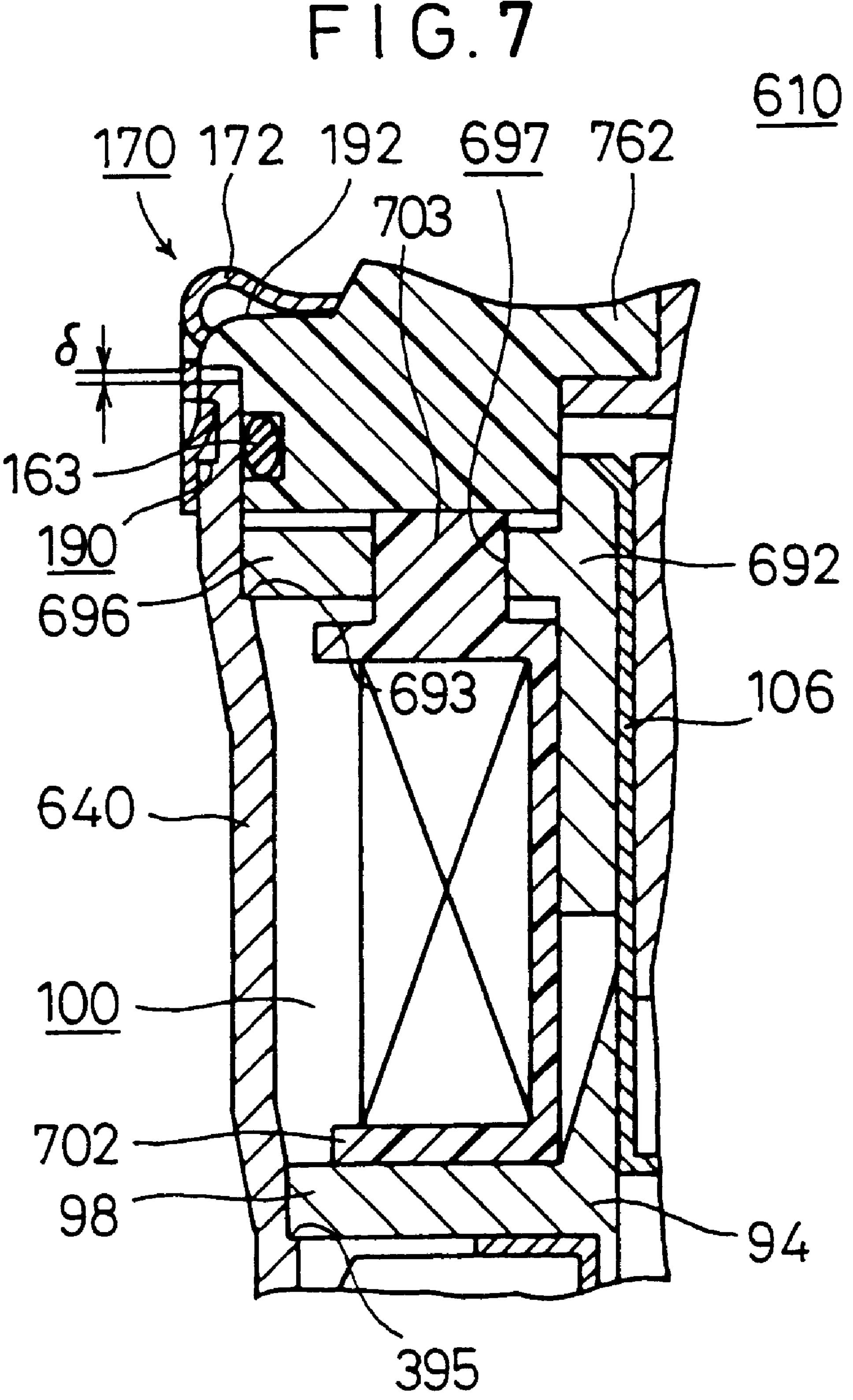
FIG. 7 is an enlarged fragmentary cross-sectional view of an actuator of an exhaust gas recirculation valve according to a third embodiment of the present invention.

FIG. 7 shows an exhaust gas recirculation valve 610 according to the third embodiment of the present invention. As shown in FIG. 7, a first support 692 is press-fitted in a housing 640 such that a first flange 696 thereof is fixedly placed on a step 693 on an upper inner wall surface of the housing 640. The first flange 696 has a hole 697 defined therein, and a protrusion 703 integral with a coil 702 projects upwardly through the hole 697. A sensor case 762 has a lower surface wide enough to be held against an upper end of the protrusion 703. The first support 692 and the lower surface of the sensor case 762 are vertically spaced a given distance from each other, and the first support 692 and an upper surface of the coil 702 vertically spaced a given distance from each other.

When the crown-shaped resilient member 172 is attached to joined portions of the sensor case 762 and the housing 640, resilient forces from the crown-shaped resilient member 172 are applied between the sensor case 762 and the housing 640 through the protrusion 703 held against the sensor case 762, the coil 702, the second support 94, and the step 395. The sensor case 762 and the housing 640 are fixed to each other, and the coil 702 and the second support 94 are fixedly held in the housing 640.

Since the first support 692 is directly fixed to the housing 640, even if the vertical dimension of the coil 702 contains an error, the first support 692 and the second support 94 can be maintained in a constant positional relationship to each other.

A valve device according to a fourth embodiment of the present invention will be described below with reference to FIG. 8.

Figure 8:
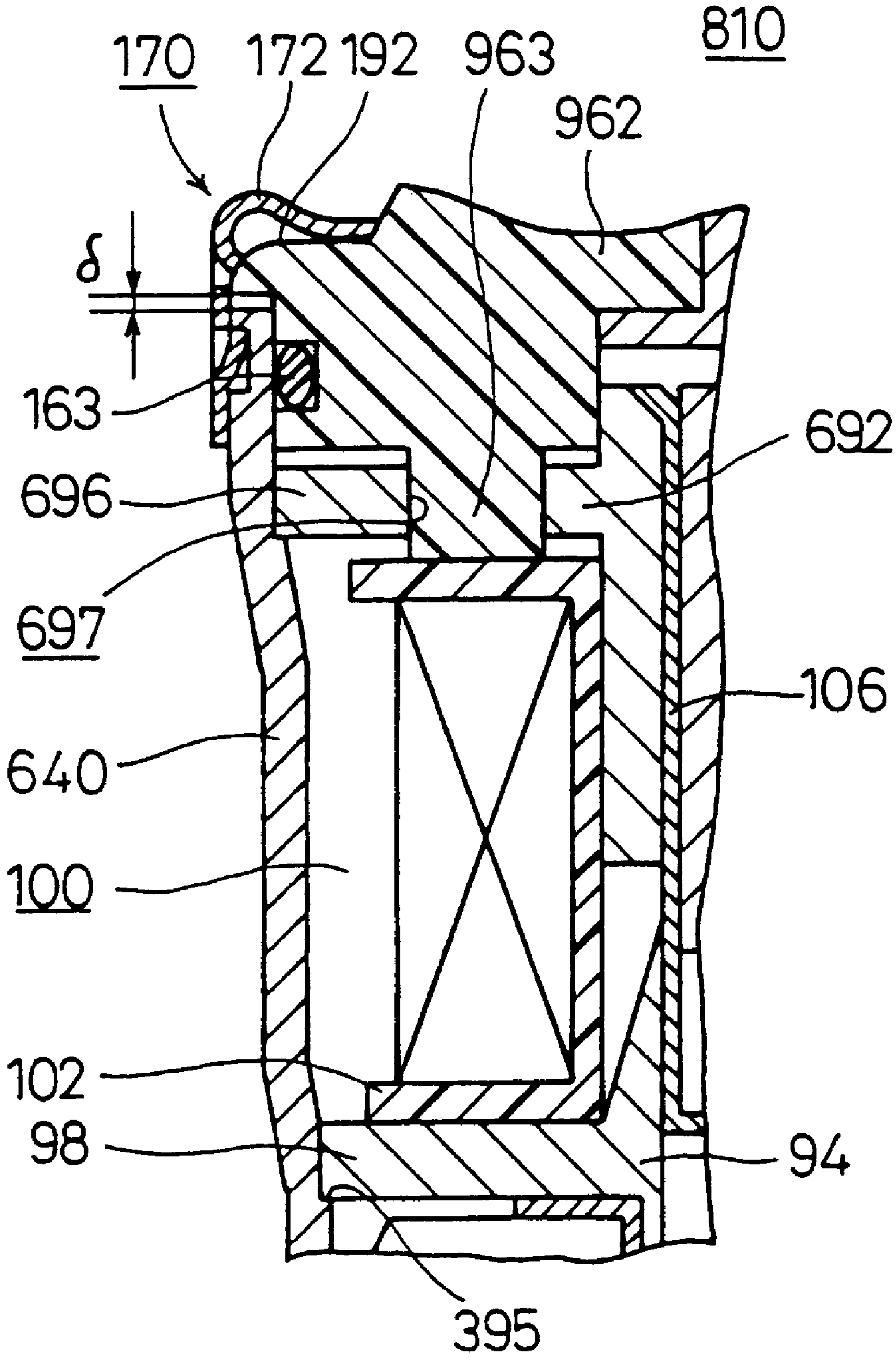
FIG. 8 is an enlarged fragmentary cross-sectional view of an actuator of an exhaust gas recirculation valve according to a fourth embodiment of the present invention.

FIG. 8 shows an exhaust gas recirculation valve 810 according to the fourth embodiment of the present invention. As shown in FIG. 8, a sensor case 962 has an integral protrusion 963 projecting downwardly from a lower surface thereof. With the sensor case 962 mounted on the housing 640, the protrusion 963 extends through the hole 697 defined in the first flange 696 of the first support 692. The protrusion 963 has a lower end abutting against the coil 102. The first support 692 and the lower surface of the sensor case 962 are vertically spaced a given distance from each other, and the first support 692 and an upper surface of the coil 102 vertically spaced a given distance from each other.

When the crown-shaped resilient member 172 is attached to joined portions of the sensor case 962 and the housing 640, resilient forces from the crown-shaped resilient member 172 are applied between the sensor case 962 and the housing 640 through the coil 102 held against the protrusion 963, the second support 94, and the step 395. The sensor case 962 and the housing 640 are fixed to each other, and the coil 102 and the second support 94 are fixedly held in the housing 640.

Since the first support 692 is directly fixed to the housing 640, even if the vertical dimension of the coil 102 contains an error, the first support 692 and the second support 94 can be maintained in a constant positional relationship to each other.

A valve device according to a fifth embodiment of the present invention will be described below with reference to FIG. 9.

Figure 9:
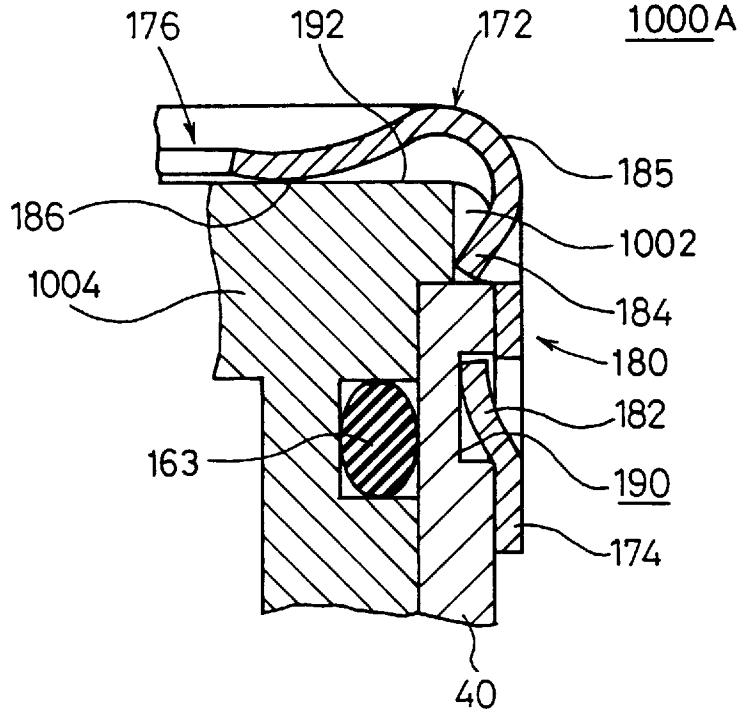
FIG. 9 is an enlarged fragmentary cross-sectional view of a fixing unit of an exhaust gas recirculation valve according to a fifth embodiment of the present invention.

FIG. 9 shows an exhaust gas recirculation valve 1000A according to the fifth embodiment of the present invention. As shown in FIG. 9, a sensor case 1004 is similar to each of the sensor cases 162, 462, 762, 962 according to the first through fourth embodiments, except that a slot 1002 is defined in the sensor case 1004 at a region aligned with each raised region 180 of the crown-shaped resilient member 172. While the crown-shaped resilient member 172 is being displaced downwardly over joined portions of the sensor case 1004 and the housing 40, the first and second teeth 182, 184 pass through the slot 1002 and hence are kept out of contact with the sensor case 162. The crown-shaped resilient member 172 is prevented from being further displaced downwardly when the second tooth 184 engages the upper surface of the housing 40.

Since the first tooth 182 does not contact the relatively soft sensor case 1004 which is made of a resin material, the sensor case 1004 is prevented from being damaged. The second tooth 184 engages the relatively hard housing 40 which is made of a metallic material to prevent the crown-shaped resilient member 172 from being further displaced downwardly. Therefore, the second tooth 184 is effective in accurately limiting the crown-shaped resilient member 172 against downward displacement. The relatively hard housing 40 is not damaged by the second tooth 184 which is held against the housing 40.

Figure 10:
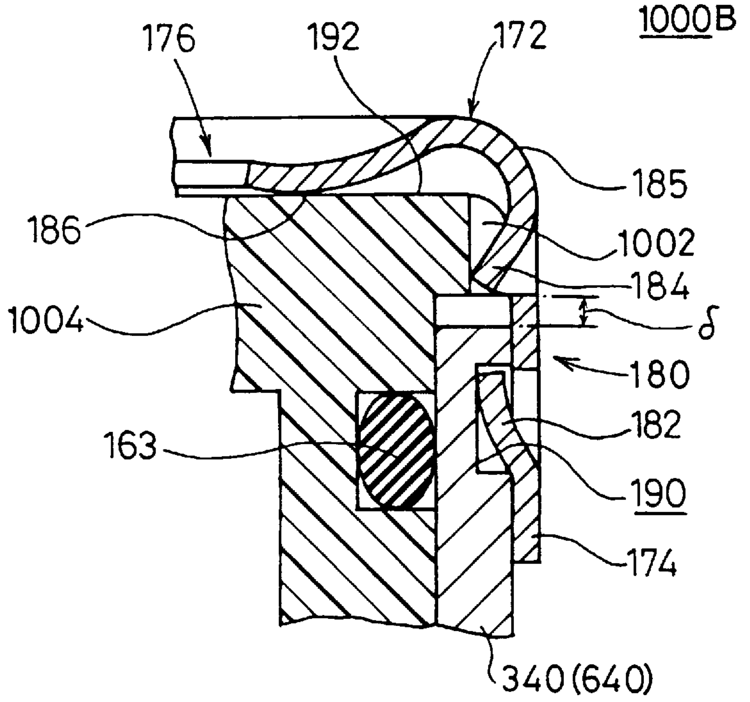
FIG. 10 is an enlarged fragmentary cross-sectional view of a modification of the fixing unit shown in FIG. 9.

FIG. 10 shows an exhaust gas recirculation valve 1000B, which is a modification of the exhaust gas recirculation valve 1000A illustrated in FIG. 9. The modified exhaust gas recirculation valve 1000B shown in FIG. 10 differs from the exhaust gas recirculation valve 1000A shown in FIG. 9 in that the housing 340 or 640 has an upper end spaced a distance δ downwardly from the sensor case 1004, as with the second through fourth embodiments shown in FIGS. 6–8.

A valve device according to a sixth embodiment of the present invention will be described below with reference to FIG. 11.

Figure 11:
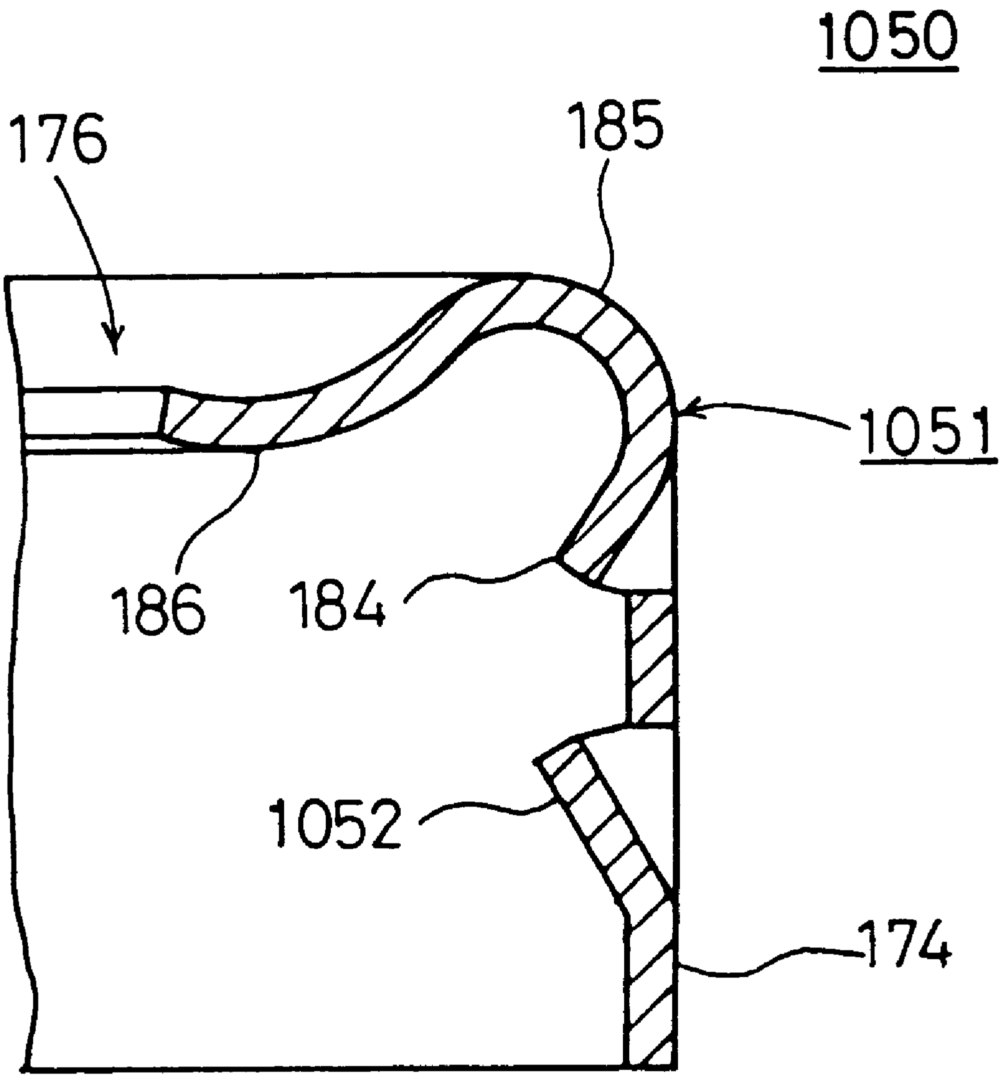
FIG. 11 is an enlarged fragmentary cross-sectional view of a fixing unit of an exhaust gas recirculation valve according to a sixth embodiment of the present invention.

FIG. 11 shows an exhaust gas recirculation valve 1050 according to the fifth embodiment of the present invention. As shown in FIG. 11, a crown-shaped resilient member 1051 has a first tooth 1052 which is formed by slitting only an upper side of a portion of the annular cylindrical member 174, and bending that portion inwardly about all other sides into an arcuate cross-sectional shape. The first tooth 1052 is inclined inwardly in the upward direction and has its tip end facing the tip end of the second tooth 184 which is identical to the second tooth 184 according to the first through fifth embodiments.

Since the first tooth 1052 has an arcuate cross-sectional shape, the first tooth 1052 is relatively less elastically deformable under external forces and has a relatively large mechanical strength. Consequently, when the first tooth 1052 contacts the outer circumferential surface of the housing 40, 340, or 640 at the time the crown-shaped resilient member 172 is installed in position, the annular cylindrical member 174 is slightly expanded radially outwardly as the crown-shaped resilient member 172 is pushed downwardly. When the annular cylindrical member 174 reaches the properly set position, the first tooth 1052 snaps into the annular groove 190, allowing the annular cylindrical member 174 to restore its original shape.

As described above, the first tooth 1052 is relatively less elastically deformable and mechanically strong. Even when forces tending to separate the housing 40, 340, or 640 and the sensor case 162, 462, 762, 962, or 1004 apart from each other, the first tooth 1052 is effective to keep them securely fixed to each other.

Although certain preferred embodiments of the present invention have been shown and described in detail, it should be understood that various changes and modifications may be made therein without departing from the scope of the appended claims.

What is claimed is:

1. A valve device comprising:

an actuator for actuating a valve assembly to selectively open and close a fluid passage, said actuator comprising a stator and a coil bobbin;

a housing accommodating said actuator therein, said housing having groove defined in an outer circumferential surface of an upper portion thereof;

a sensor case accommodating a sensor for detecting an open/closed state of said valve assembly;

a crown-shaped resilient member substantially complementary in shape to joined portions of said housing and said sensor case and fixing said housing and said sensor case to each other;

said crown-shaped resilient member being resiliently fitted over said joined portions to fix said housing and said sensor case to each other, said stator and said coil bobbin being sandwiched in position between said housing and said sensor case, wherein said crown-shaped resilient member comprises:

a cylindrical member complementary in shape to said joined portions of said housing and said sensor case, said cylindrical member having one tooth engaging in said groove of said housing to prevent said crown-shaped resilient member from being displaced toward said sensor case, and another tooth facing said sensor case and engaging an upper surface of said joined portions to prevent said crown-shaped resilient member from being displaced toward said housing;

a flange made of a resilient material extending radially inwardly from an end of said cylindrical member along the upper surface of said joined portions, said flange being held against said upper surface; and a curved portion joining said cylindrical member and said flange, wherein said curved portion remains out of contact with said upper surface after said crown-shaped resilient member has been fitted over said joined portions.

2. A valve device according to claim 1, wherein said sensor case has a step on said upper surface of said joined portions, said flange having a ledge held against said step.

3. A valve device according to claim 1, wherein said cylindrical member has a tooth, and said housing has a groove defined in an outer circumferential surface of an upper portion thereof, said tooth engaging in said groove to prevent said crown-shaped resilient member from being displaced toward said sensor case.

4. A valve device according to claim 3, wherein said cylindrical member has another tooth facing said sensor case, said other tooth engaging said upper surface of said joined portions to prevent said crown-shaped resilient member from being displaced toward said housing.

5. A valve device according to claim 1, wherein said housing has an open end to which said sensor case is joined and a closed end remote from said open end, said stator comprising:

a first stator disposed in said housing near said open end and held against said sensor case; and a second stator disposed in said housing near said closed end, said coil bobbin being sandwiched and held between said first stator and said second stator, said second stator being held against an inner surface of said housing against displacement toward said closed end;

said open end of said housing at said joined portions being spaced from said sensor case by a predetermined distance along a direction in which said sensor case is installed on said housing.

6. A valve device according to claim 5, wherein said sensor case has a step on said upper surface of said joined portions, said flange having a ledge held against said step.

7. A valve device according to claim 1, wherein said housing has an open end to which said sensor case is joined and a closed end remote from said open end, said stator comprising:

a first stator disposed in said housing near said open end and fixed against said sensor case; and a second stator disposed in said housing near said closed end and held against displacement toward said closed end, said coil bobbin being sandwiched and held between said sensor case and said second stator;

said open end of said housing at said joined portions being spaced from said sensor case by a predetermined distance along a direction in which said sensor case is installed on said housing.

8. A valve device according to claim 7, wherein said sensor case has a step on said upper surface of said joined portions, said flange having a ledge held against said step.

9. A valve device according to claim 7, wherein said cylindrical member has a tooth, and said housing has a groove defined in an outer circumferential surface of an upper portion thereof, said tooth engaging in said groove to prevent said crown-shaped resilient member from being displaced toward said sensor case.

10. A valve device according to claim 9, wherein said cylindrical member has another tooth facing said sensor case, said other tooth engaging said upper surface of said joined portions to prevent said crown-shaped resilient member from being displaced toward said housing.

11. A valve device comprising:

a housing accommodating an actuator for actuating a valve assembly to selectively open and close a fluid passage;

a sensor case accommodating a sensor for detecting an open/closed state of said valve assembly; and a crown-shaped resilient member substantially complementary in shape to joined portions of said housing and said sensor case, said crown-shaped resilient member being resiliently fitted over said joined portions to fix said housing and said sensor case to each other, a housing accommodating an actuator for actuating a valve assembly to selectively open and close a fluid passage, said housing having a groove defined in an outer circumferential surface of an upper portion thereof;

a sensor case accommodating a sensor for detecting an open/closed state of said valve assembly; and a crown-shaped resilient member substantially complementary in shape to joined portions of said housing and said sensor case, said crown-shaped resilient member being resiliently fitted over said joined portions to fix said housing and said sensor case to each other, wherein said crown-shaped resilient member comprises:

a cylindrical member complementary in shape to said joined portions of said housing said sensor case, said cylindrical member having one tooth engaging said groove of said housing to prevent said crown-shaped resilient member from being displaced toward said sensor case, and another tooth facing said sensor case and engaging a upper surface of said joined portions to prevent said crown-shaped resilient member from being displaced toward said housing;

a flange made of a resilient material extending radially inwardly from an end of said cylindrical member along the upper surface of said joined portions, said flange being held against said upper surface; and a curved portion joining said cylindrical member and said flange, wherein said curved portion remains out of contact with said upper surface after said crown-shaped resilient member has been fitted over said joined portions.

12. A valve device according to claim 2, wherein said sensor case has a step on said upper surface of said joined portions, said flange having a ledge held against said step.

* * * * *